United States Patent [19]

Morimoto et al.

[11] Patent Number: 5,299,050

[45] Date of Patent: Mar. 29, 1994

[54] SCANNING OPTICAL SYSTEM

[75] Inventors: Akira Morimoto; Masaaki Aoyama, both of Tokyo, Japan

[73] Assignee: Asahi Kogaku Kogyo Kabushiki Kaisha, Tokyo, Japan

[21] Appl. No.: 821,782

[22] Filed: Jan. 16, 1992

[30] Foreign Application Priority Data

| | | | |
|---|---|---|---|
| Jan. 16, 1991 | [JP] | Japan | 3-073576 |
| Jan. 16, 1991 | [JP] | Japan | 3-073577 |
| Jan. 17, 1991 | [JP] | Japan | 3-078126 |
| Jan. 17, 1991 | [JP] | Japan | 3-078127 |

[51] Int. Cl.$^5$ .............................. G02B 26/10
[52] U.S. Cl. ..................... 359/212; 359/232; 359/833; 359/893; 250/236
[58] Field of Search ............... 359/212, 213, 216, 217, 359/220, 221, 232, 831, 833, 837, 893, 637, 855; 250/201, 235, 236; 372/24

[56] References Cited

U.S. PATENT DOCUMENTS

| | | | |
|---|---|---|---|
| 4,070,111 | 1/1978 | Harrick | 359/216 |
| 4,171,902 | 10/1979 | Imai et al. | 355/11 |
| 4,586,782 | 5/1986 | Sakuma et al. | 359/212 |
| 4,731,623 | 3/1988 | Oda et al. | 359/216 |
| 4,863,227 | 9/1989 | Takanashi | 359/217 |
| 4,902,084 | 2/1990 | Aharon | 350/6.8 |
| 4,930,869 | 6/1990 | Miyagawa et al. | 359/217 |
| 5,134,513 | 7/1992 | Morimoto | 359/232 |
| 5,161,047 | 11/1992 | Tomita et al. | 359/216 |

FOREIGN PATENT DOCUMENTS

| | | |
|---|---|---|
| 0387900 | 9/1990 | European Pat. Off. |
| 4029257 | 3/1991 | Fed. Rep. of Germany . |
| 438903 | 11/1935 | United Kingdom . |
| 9102996 | 3/1991 | World Int. Prop. O. . |

*Primary Examiner*—Bruce Y. Arnold
*Assistant Examiner*—James Phan
*Attorney, Agent, or Firm*—Sandler, Greenblum & Bernstein

[57] ABSTRACT

A scanning optical system for preventing ghosting is provided wherein a laser beam emitted by a laser light source is first brought to an image in an auxiliary scanning plane, and reflected by a slit mirror provided in a prism block. The laser beam is incident on the scanning deflector along the optical axis of the scanning lens, and a screen is provided for obstructing ghosting in the vicinity of the scanning surface. Further, at least one side of the prism block on which the light is incident from which the light emerges is curved, or one side of the prism block is treated to prevent reflection. Further, the screen is disposed between the laser light source and the slit mirror so as to obstruct the part of the light beam incident on the mirror which is reflected by the mirror after being reflected by the scanning deflector.

22 Claims, 21 Drawing Sheets

20mm

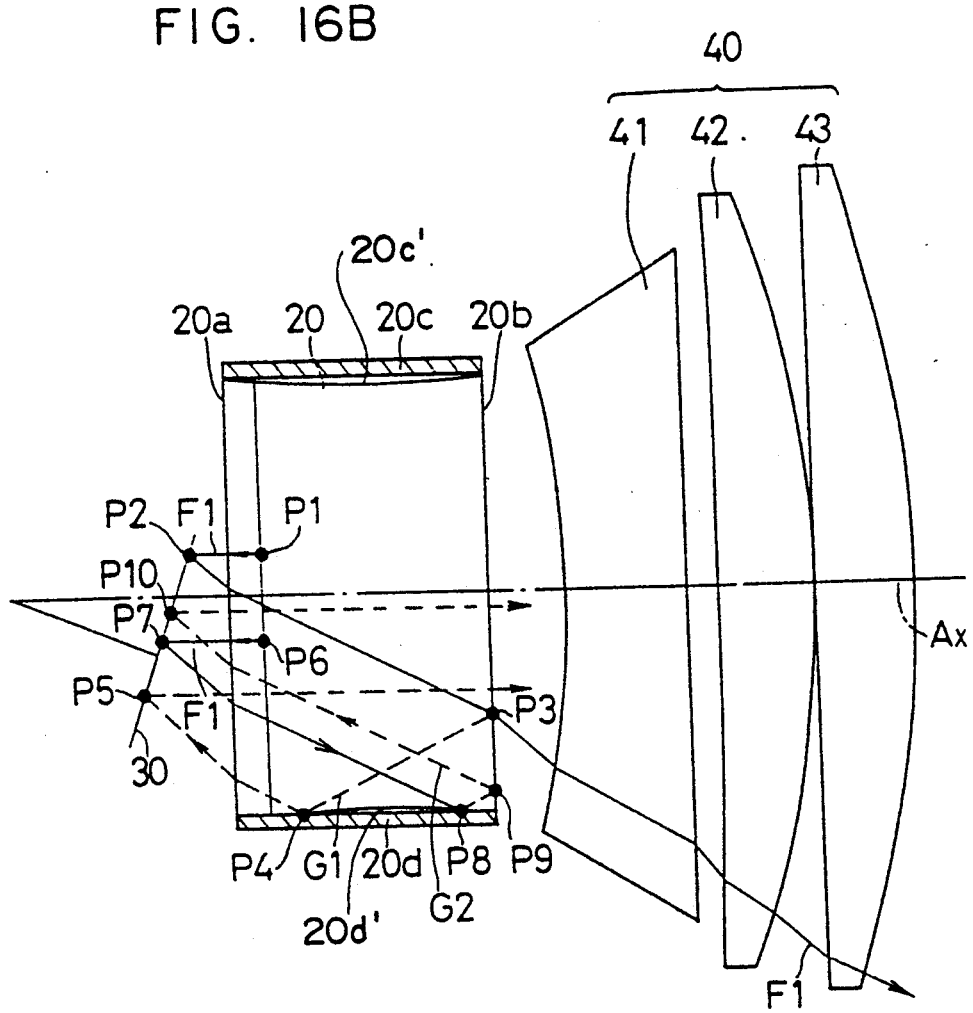

SCANNING OPTICAL SYSTEM

BACKGROUND OF THE INVENTION

1. Field of the Invention

This invention concerns a scanning optical system for a laser printer or other device wherein a light beam is made to scan a scanning surface by using a scanning deflector, and in particular concerns the prevention of ghost images.

2. Description of the Prior Art

In conventional scanning optical systems that use a polygon mirror as a deflector, a light beam is first brought to an image in an auxiliary scanning plane and forms a spot on a scanning surface using an anamorphic fθ lens in order to correct a tilting error of the reflecting surface of the polygon mirror.

In such a conventional optical scanning device, as the optical system has a high positive power in the auxiliary scanning direction, the peripheral part of the image in that direction is, to some extent, curved behind the scanning surface. This curvature has to be corrected by the displacement of the reflection point on the polygon mirror when the mirror rotates.

In this conventional scanning system, however, the angle made by the light beam incident on the polygon mirror with the optic axis of the fθ lens is generally 50°-90°. In this case the displacement of the reflection point on the polygon mirror and hence the curvature of the image are both asymmetrical with respect to the optic axis, and if the lens used is symmetrical with respect to the optic axis, the above asymmetrical curvature cannot be corrected. If the number of reflecting surfaces of the polygon mirror is the same, the displacement of the reflection point on the mirror depends on the mirror diameter. The diameter of the polygon mirror can therefore be increased so as to for the curvature of the image, but in this case the aforesaid asymmetry also increases.

SUMMARY OF THE INVENTION

It is therefore an object of the invention to provide a scanning optical system wherein the displacement of the reflection point on the polygon mirror is minimized, the curvature of the image is satisfactorily corrected and the effect of ghosting on the image is suppressed.

The scanning optical system of this invention is characterized by an arrangement wherein a laser beam emitted by a laser source is first brought to an image in an auxiliary scanning plane, reflected by a slit mirror in a prism block and caused to impinge on a scanning deflector along the optic axis of a scanning lens, and by the provision of a screen which obstructs ghosting.

The system is further characterized in that either the side of the prism block on which the light is incident or the side from which it emerges is a curved surface, or both of these sides are curved surfaces, or the sides are treated so that they do not reflect light.

The system is yet further characterized in being provided with a screening means interposed between the laser source and the slit mirror which, of the light beam incident on the slit mirror, screens that part which is reflected by the mirror after it is reflected by the scanning deflector.

BRIEF DESCRIPTION OF DRAWINGS

FIG. 16b is a schematic view illustrating the prevention of ghosting by the scattering of light by frosted surfaces so that light does not return to the polygon mirror.

DETAILED DESCRIPTION OF THE EMBODIMENTS

The embodiment of the present invention will now be described hereinafter with reference to the drawings. The present disclosure relates to the subject matter contained in Japanese Patent Application Nos. H3-73576 (filed on Jan. 16, 1991), H3-73577 (filed on Jan. 16, 1991), H3-78126 (filed on Jan. 17, 1991) and H3-

78127 (filed on Jan. 17, 1991) which are expressly incorporated herein by reference in their entireties.

Embodiment 1

Figure 1:
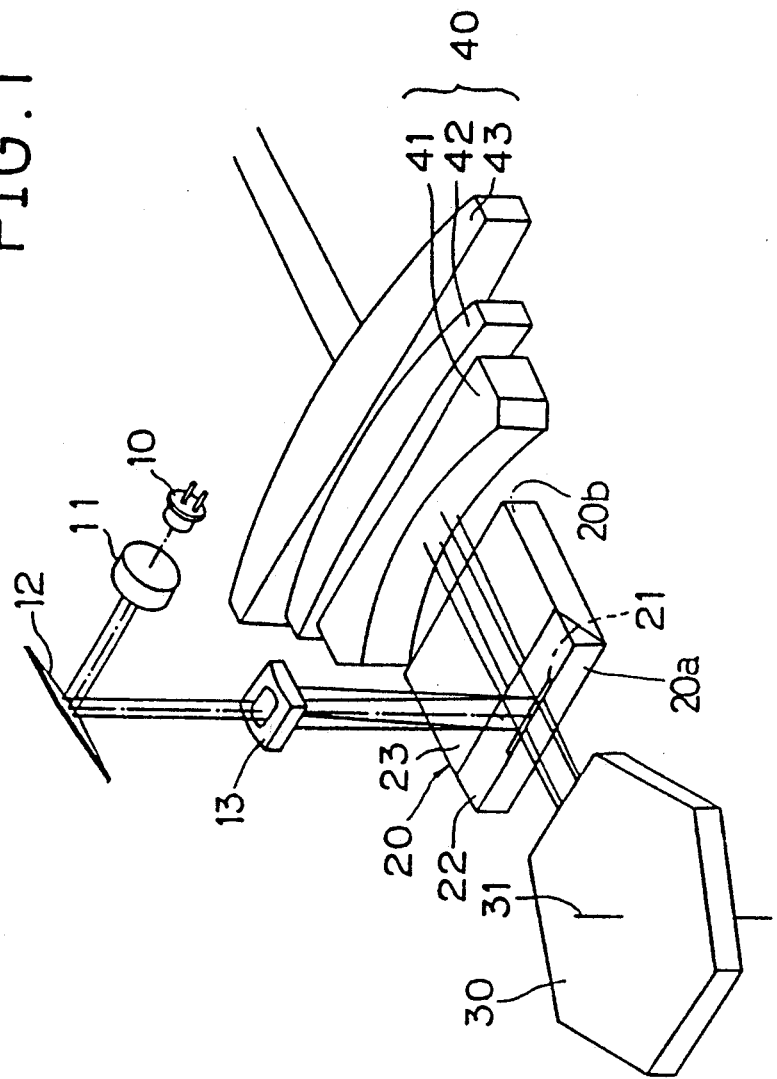
FIG. 1 is a perspective view illustrating the construction of Embodiment 1.

FIG. 1 is a perspective view showing the arrangement of optical devices in a scanning optical system according to Embodiment 1.

The optical system shown in FIG. 1 comprises a semiconductor laser 10 as a light source, a collimator lens 11 which causes the divergent light emitted by the semiconductor laser 10 to become a parallel light beam, a mirror 12, a cylindrical lens 13 for bringing the collimated light beam to a line spread function image, a prism block 20 having a slit mirror 21 coinciding with the position of this line spread function image, a polygon mirror 30 which acts as a scanning deflector for reflecting and deflecting the light beam reflected by the slit mirror 21, and an anamorphic fθ lens 40 which acts as a scanning lens for converging the light beam reflected by the polygon mirror 30 and bringing it to a spot on a scanning surface.

In the aforesaid description, the plane in which the light beam is made to scan by the polygon mirror 30 is a principal scanning plane, and the plane perpendicular to the principal scanning plane containing the optic axis of the scanning lens is an auxiliary scanning plane.

The prism block 20 is a rectangular parallelepiped consisting of a triangular pole prism 22 cemented to a trapezoidal prism 23, and the slit mirror 21 which is a full reflecting mirror is deposited on the cemented surface.

The angle of the slit mirror 21 is approximately 45° with respect to the principal scanning plane.

The divergent light emitted by the semiconductor laser 10 is collimated, and formed as a line spread function image perpendicular to the auxiliary scanning plane by the cylindrical lens 13. As the slit mirror 21 coincides with the position of this line spread function image, the light beam from the light source is formed as an image on the slit mirror 21, fully reflected by this reflecting surface and directed towards to the polygon mirror 30 along the optic axis of the fθ lens 40.

After being reflected and deflected by the polygon mirror 30, the light beam again arrives at the prism block 20 with a predetermined width. At the prism block, most of the light beam passes through part of the area surrounding the slit mirror 21 to impinge on the fθ lens 40, and forms a spot on a scanning surface, (not shown).

In the aforesaid embodiment, the optical system is arranged to have a high positive power in the auxiliary scanning direction in order to first bring the light beam to an image on the slit mirror, so the peripheral region of the image tends to curve behind the scanning surface. In this embodiment, however, the prism block 20 also functions such that the converging point in the peripheral region of the scanning surface in the auxiliary scanning direction is closer to the fθ lens than the converging point in the central region. The curvature of the field can therefore be corrected by varying the reflection point on the polygon mirror 30 and displacing the converging point by means of the prism block.

The light beam traveling from the polygon mirror to the fθ lens is parallel in the principal scanning plane and divergent in the auxiliary scanning plane. The prism block 20 placed in the optical path therefore does not act on the light beam in the principal scanning direction, while in the auxiliary scanning direction, it displaces the converging point depending on the incidence angle. In other words, the object distance is shorter for light off the axis than for light on the axis. As a result, the imaging point for light off the axis moves closer to the fθ lens, and the curvature of the peripheral region of the image is improved.

Figure 2:
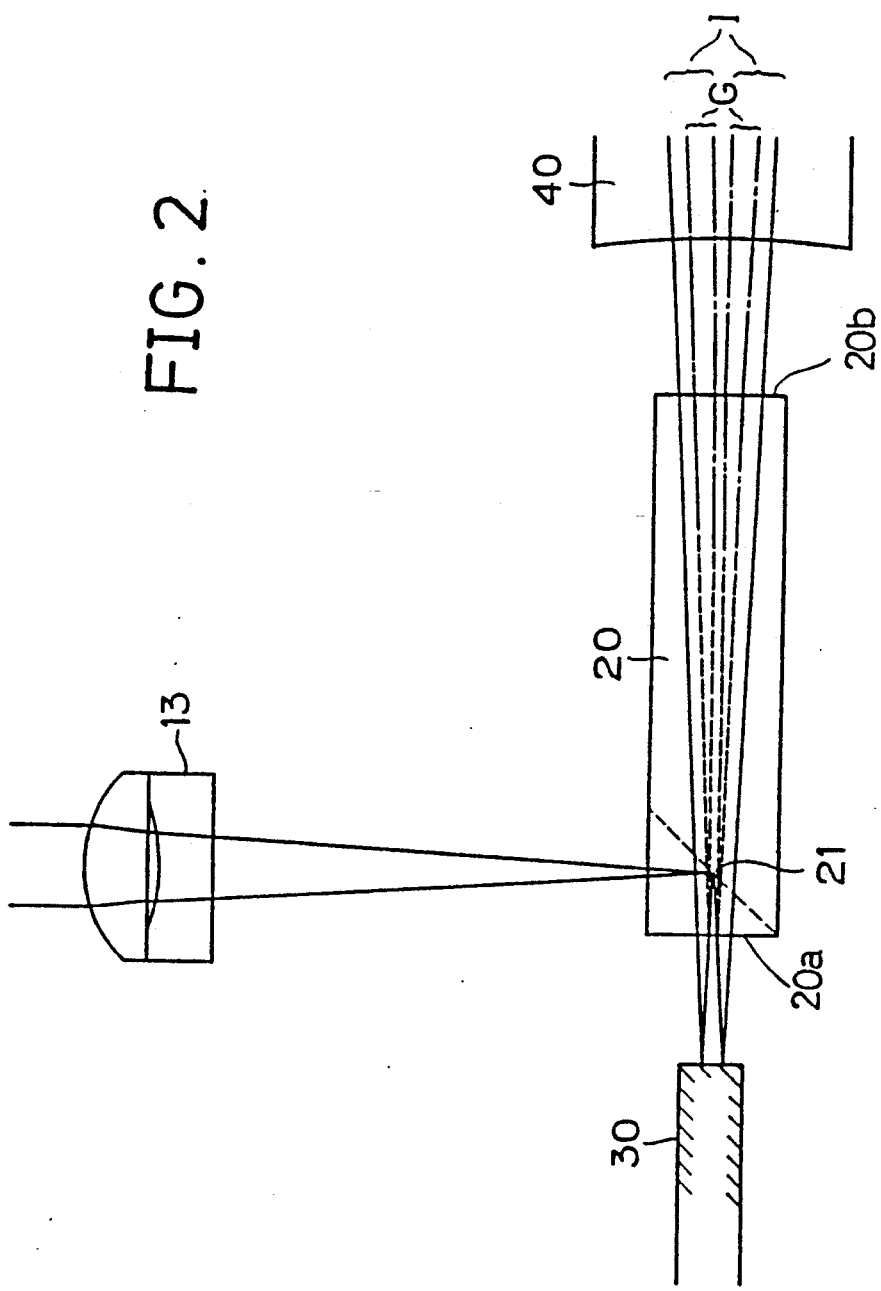
FIG. 2 is a schematic view illustrating the occurrence of ghosting due to internal surface reflection from one side of the prism block.

Next, the occurrence of ghosting due to reflection at the inner surface of the prism block based on FIG. 2.

Part of the light beam reflected by the slit mirror 21 toward the polygon mirror 30, is reflected by one side 20a of the prism block 20 near the polygon mirror so as to produce ghosting light, and this light reaches the scanning surface via the fθ lens 40 together with imaging light. In FIG. 2, of the light beam which is incident on the fθ lens 40, I indicates the range of imaging light and G indicates the range of imaging light which includes ghosting.

The imaging light spot moves across the scanning surface as the polygon mirror 30 rotates, but the ghosting light always reaches the scanning surface at a fixed angle. Therefore, even if the energy of the ghosting light is smaller than the imaging light, the ghosting energy reaching any point on the scanning surface in unit time tends to be higher than the imaging energy reaching the same point on the scanning surface in unit time.

If the imaging power is Ii, the ghosting power is Ig, the scan times per second is r, the scanning efficiency is $\eta$, the scanning width is L, the scanning pitch in the auxiliary scanning direction is p and the scanning spot diameter is s, the imaging energy Ji and the ghosting energy Jg are given respectively by the following equations (1) and (2):

$$Ji = Ii \cdot (\eta/rLp) \tag{1}$$

$$Jg = Ig/rsp \tag{2}$$

From equation (1) and (2), we obtain the following equation (3):

$$Jg/Ji = (Ig/Ii)(L/\eta S) \tag{3}$$

If for example we set the values $L = 6 \times 10^5 \mu$, $s = 30\mu$, $\eta = 0.5$, we obtain equation (4):

$$Jg/Ji = 40000 Ig/Ii/ \tag{4}$$

Accordingly, even if the ghosting intensity were only 1/40000 of that of the imaging light, ghosting would be detected as having the same energy as imaging light. Therefore, even if the reflection at the side of a flat plate were reduced to 0.1% by means of an antireflection coating, an energy equal to 40 times that of the imaging light would remain as "ghosting".

Next, we will describe methods of preventing ghosting.

Figure 3:
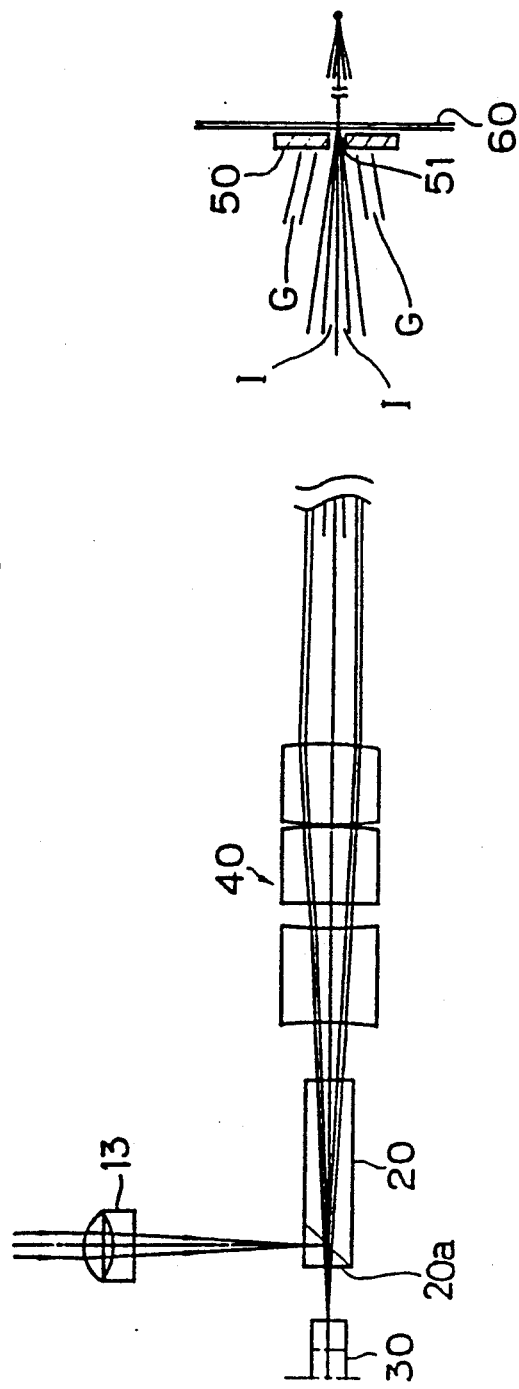
FIG. 3 is a drawing of a principal scanning plane of the optical system illustrated in FIG. 1.
Figure 4:
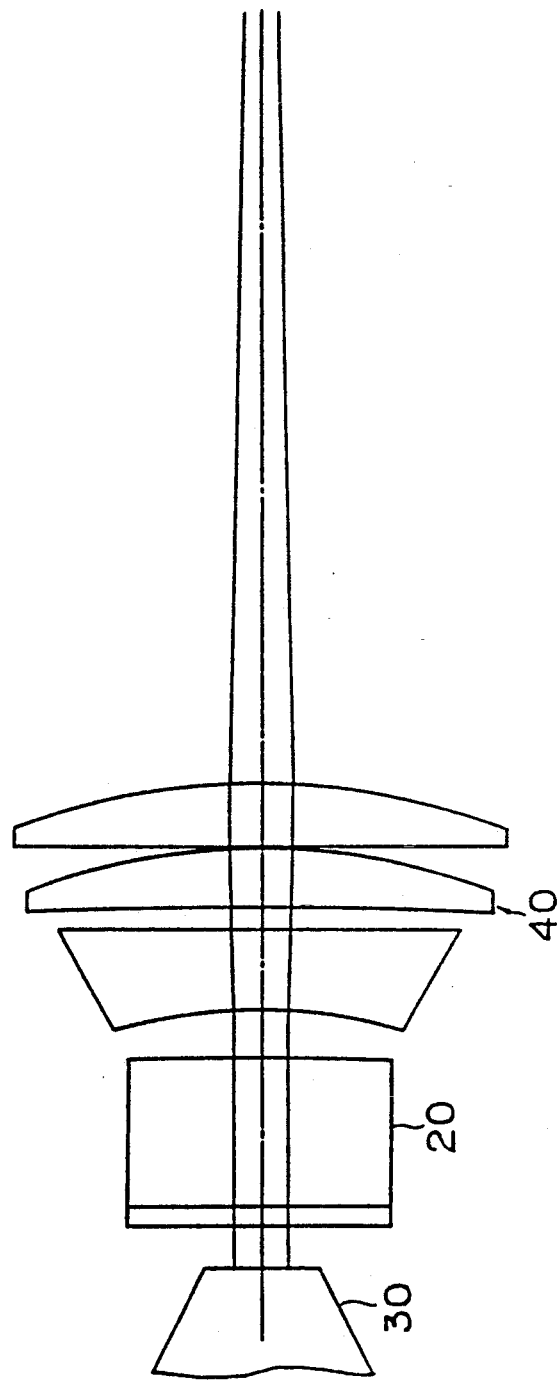
FIG. 4 is a drawing of an auxiliary scanning plane of the optical system illustrated in FIG. 1.

FIGS. 3 and 4 respectively show the principal scanning plane and auxiliary scanning plane of FIG. 1.

In this apparatus, a screen 50 having a long slit 51 in the principal scanning direction is provided near the scanning surface 60 (as shown in FIG. 3) so as to prevent ghosting light from reaching the scanning surface 60. As the side 20a where ghosting light is reflected is closer to the scanning surface than the polygon mirror 30 where imaging light is reflected, the optical path of ghosting is shorter than that of imaging light. The difference between the path lengths of ghosting light and imaging light is twice the distance from the side 20a of the prism block 20 facing the polygon mirror to the polygon mirror 30.

The imaging light and ghosting light incident on the prism block 20 are both convergent beams in the auxiliary scanning direction. Due to the aforesaid difference of optical paths, the imaging point of ghosting light in the auxiliary scanning direction is behind that of imaging light, so the ghosting diverges more than imaging light in front of the scanning surface. Provided the screen 50 does not obstruct the scanning region of imaging light, most of the effect of ghosting can be eliminated.

In particular, if the prism block has a slit mirror 21 as in the aforesaid embodiment, the center region in the auxiliary scanning direction is eclipsed by the slit mirror 21 for both imaging light and ghosting. By making the width of the slit 51 smaller than the width of the region which is eclipsed, ghosting can therefore be completely eliminated.

Figure 5:
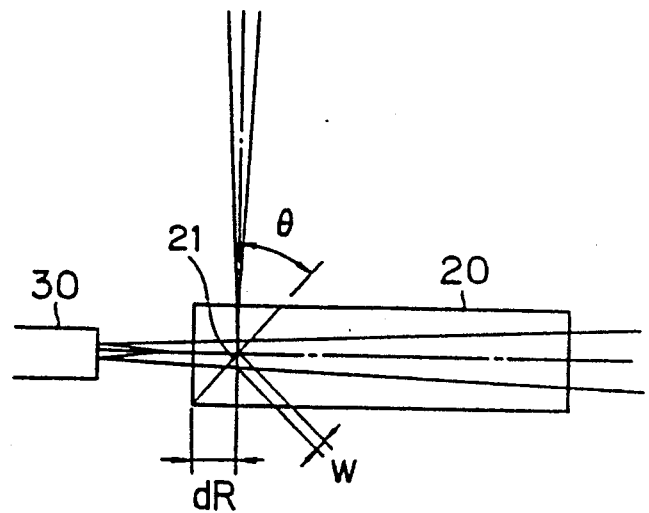
FIG. 5 is a schematic view showing the parameters of the slit mirror part of the optical system illustrated in FIG. 1.

As shown in FIG. 5, is the incidence angle on the slit mirror 21 from the side of the light source is $\theta$ and the width of the slit mirror 21 is w, the distance from the center region of the slit mirror to the side 20a of the prism block 20 facing the polygon mirror 30 is dR, the F number in air in the auxiliary scanning plane of the light beam converged by the slit mirror is FNo., and the refractive index of the prism block is nF, then the proportion P of the whole spread of ghosting which is occupied by the missing center region is given by the following equation:

$$P = (nF \cdot FNo. \cdot w \cdot \cos \theta)/(2 \cdot dR)$$

The greater the proportion occupied by the missing center region, the wider the slit 51 can be made and the less precise the position of the screen has to be. In order to widen the slit 51 of the screen 50 and facilitate the setting, P should be arranged to be grater than 20%.

In the case of Embodiment 1, $\theta = 45°$, w = 0.5 mm, dR = 10.0 mm, FNo. = 8, nF = 1.51072 and P = 21%.

Next, a specific numerical example of the embodiment.

Figure 6:
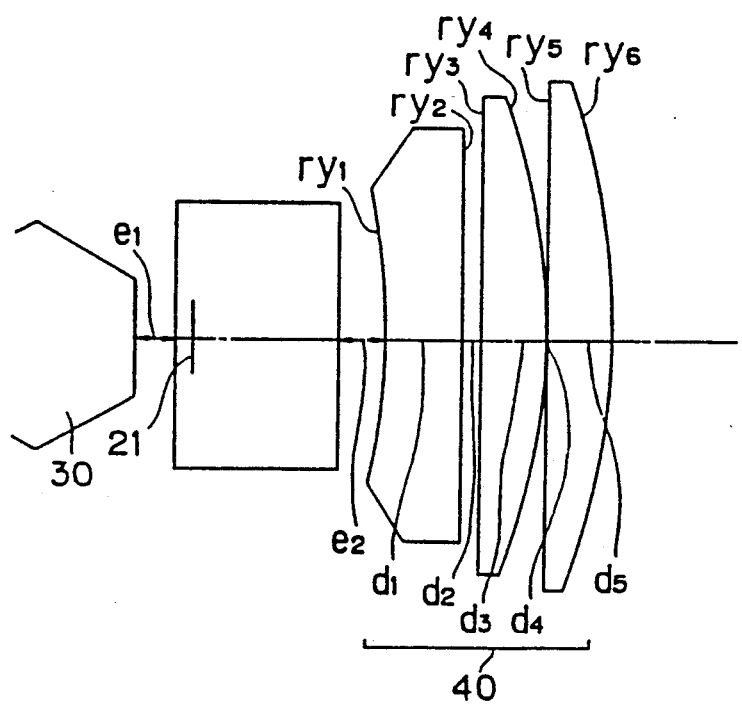
FIG. 6 is a section of the principal scanning plane of the slit mirror part of the optical system illustrated in FIG. 1.
Figure 7A:
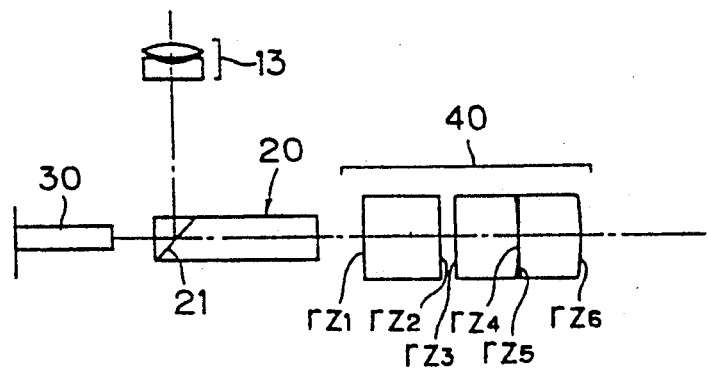
FIG. 7A is a section of the auxiliary scanning plane of the slit mirror part of the optical system illustrated in FIG. 1.

FIGS. 6 and 7A are respectively the principal and auxiliary scanning planes of the optical system close to the $f\theta$ lens.

Figure 7B:
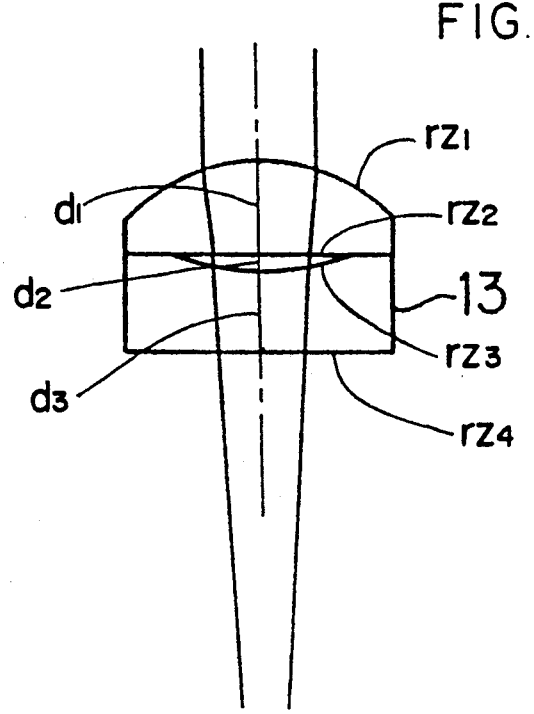
FIG. 7B is a section of the auxiliary scanning plane of the cylindrical lens of the optical system illustrated in FIG. 1.

FIG. 7B is the auxiliary scanning plane of the cylindrical lens of the optical system.

The curvatures of the sides of the optical devices and the distances between devices are as shown in Tables 1 and 2. Tables 1 and 2 show parameters concerning, respectively, the cylindrical lens and the $f\theta$ lens. The arrangement in this example is suitable for a semiconductor laser with an oscillation wavelength $\lambda = 780$ nm.

In the tables, ry is the radius of curvature in the principal scanning direction, rz is the radius of curvature in the auxiliary scanning direction, fc is the focal length in the auxiliary scanning direction of the cylindrical lens, L1 is the equivalent distance in air from the last surface of the cylindrical lens to the line spread function image, fy is the focal length in the principal scanning direction of the $f\theta$ lens, and fb is the distance from the last surface of the $f\theta$ lens to the scanning surface.

In the tables, the unit of the radius for curvature and the distance is millimeters.

TABLE 1

| surface number | fc = 100.61 L1 = 74.03 | | | |
|---|---|---|---|---|
| | ry | rz | d | n |
| 1 | ∞ | 21.0 | 10.00 | 1.51072 |
| 2 | ∞ | ∞ | 2.08 | |
| 3 | ∞ | −28.0 | 8.00 | 1.51072 |
| 4 | ∞ | ∞ | | |

TABLE 2

| surface number | fy = 659.63 fb = 763.23 | | | |
|---|---|---|---|---|
| | ry | rz | d | n |
| 1 | −280.0 | −280.0 | 39.64 | 1.71230 |
| 2 | ∞ | 190.0 | 10.56 | |
| 3 | −3770.306 | −3770.306 | 31.21 | 1.51072 |
| 4 | −315.0 | −315.0 | 1.00 | |
| 5 | ∞ | ∞ | 32.00 | 1.71230 |
| 6 | −350.0 | −93.3 | | |

The thickness of the prism block in the direction of the optic axis is 83.6, the equivalent distance in air from the line spread function image to the basic reflection point on the polygon mirror (reflection point when the reflecting surface of the polygon mirror is perpendicular to the optic axis of the $f\theta$ lens ) is 28.05 mm, the inscribed radius of the polygon mirror is 49, and the distance from the aforesaid basic reflection point to the first surface of the $f\theta$ lens is 129.59 mm.

Figure 8:
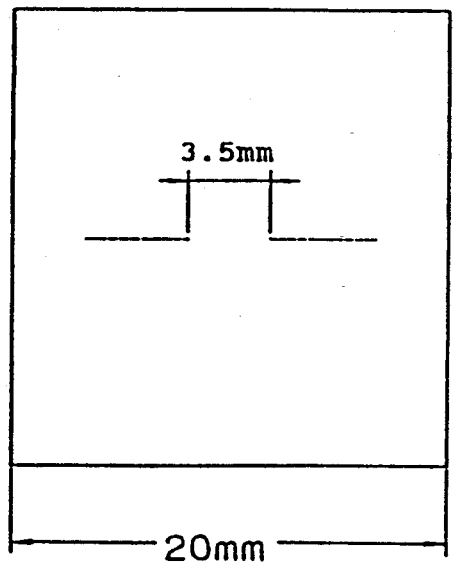
FIG. 8 is a descriptive diagram showing the form of ghosting on the image of Embodiment 1.

FIG. 8 shows the form of ghosting on the scanning surface 60 in the aforesaid numerical arrangement when the screen 50 is not provided. The center region eclipsed by the slit mirror 21 is missing, the width of this region being approx. 3.5 mm.

Embodiment 2

Figure 9:
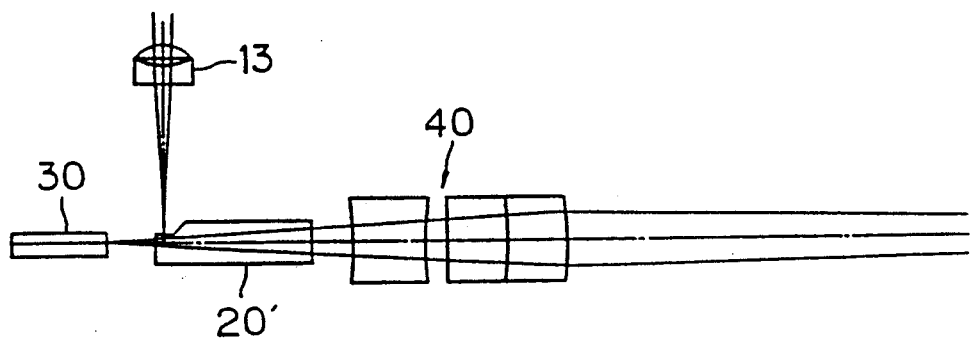
FIG. 9 is a section of the auxiliary scanning plane illustrating the construction of Embodiment 2.
Figure 10:
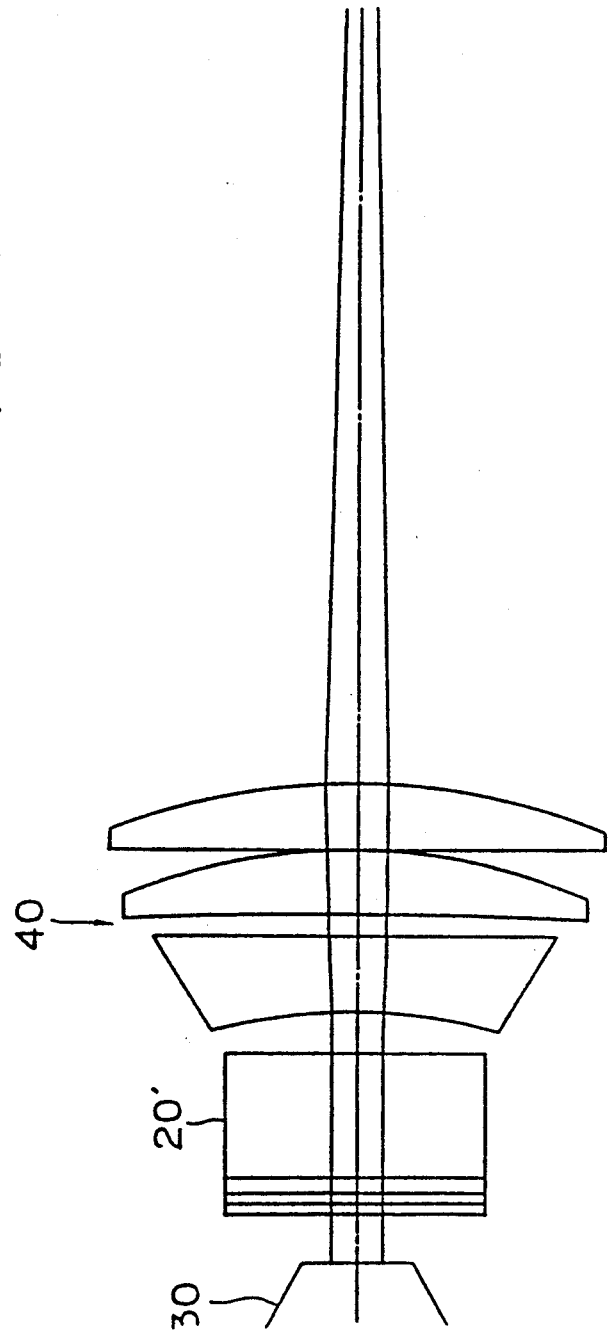
FIG. 10 is a section of the principal scanning plane illustrating the construction of Embodiment 2.

FIGS. 9 and 10 are drawings, respectively, of the auxiliary scanning plane and principal scanning plane of the essential parts of the optical system of Embodiment 2.

As ghosting light diverges in the auxiliary scanning direction as it traverses the prism block, the shorter the distance dR is from the slit mirror to the side of the prism block facing the polygon mirror, the greater is the proportion occupied by the center region eclipsed by the slit mirror.

Figure 11:
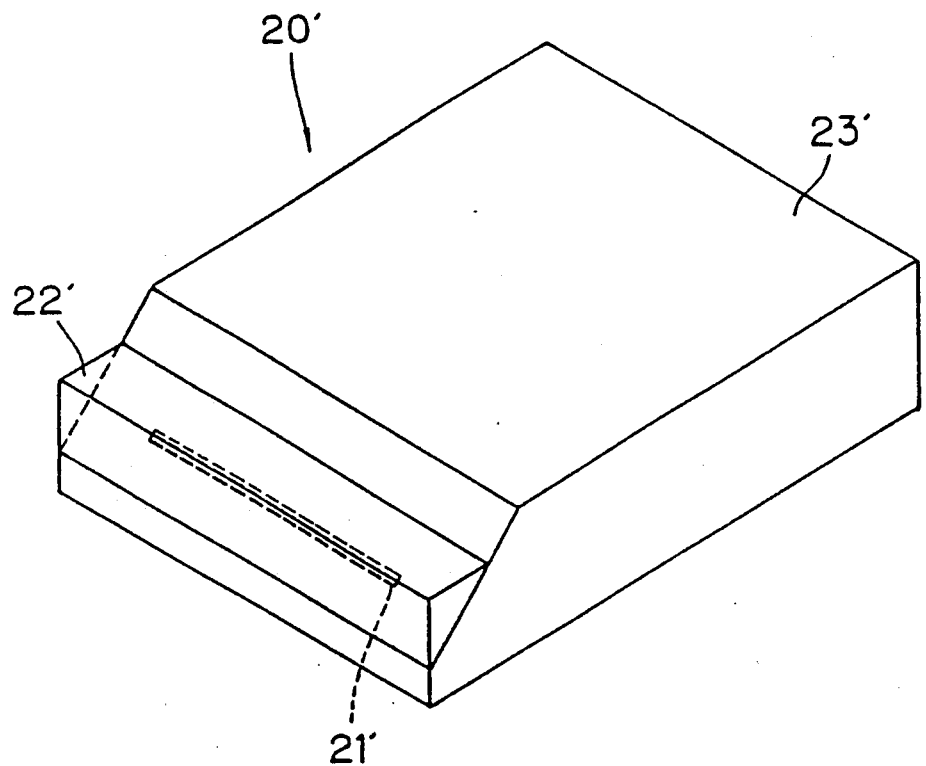
FIG. 11 is a perspective view of the prism block of Embodiment 2.

In view of the aforesaid points, the optical system of Embodiment 2 comprises a prism block 20' that makes the distance dR smaller. As shown enlarged in FIG. 11, the prism block 20' comprises a trapezoidal prism 23' as in Embodiment 1, and a triangular prism 22' cemented to its inclined surface. The inclined surface of the triangular prism 22' is smaller than that of the trapezoidal prism 23', and a slit mirror 21' is provided in a central position on the inclined surface of the triangular prism 22'.

Figure 12:
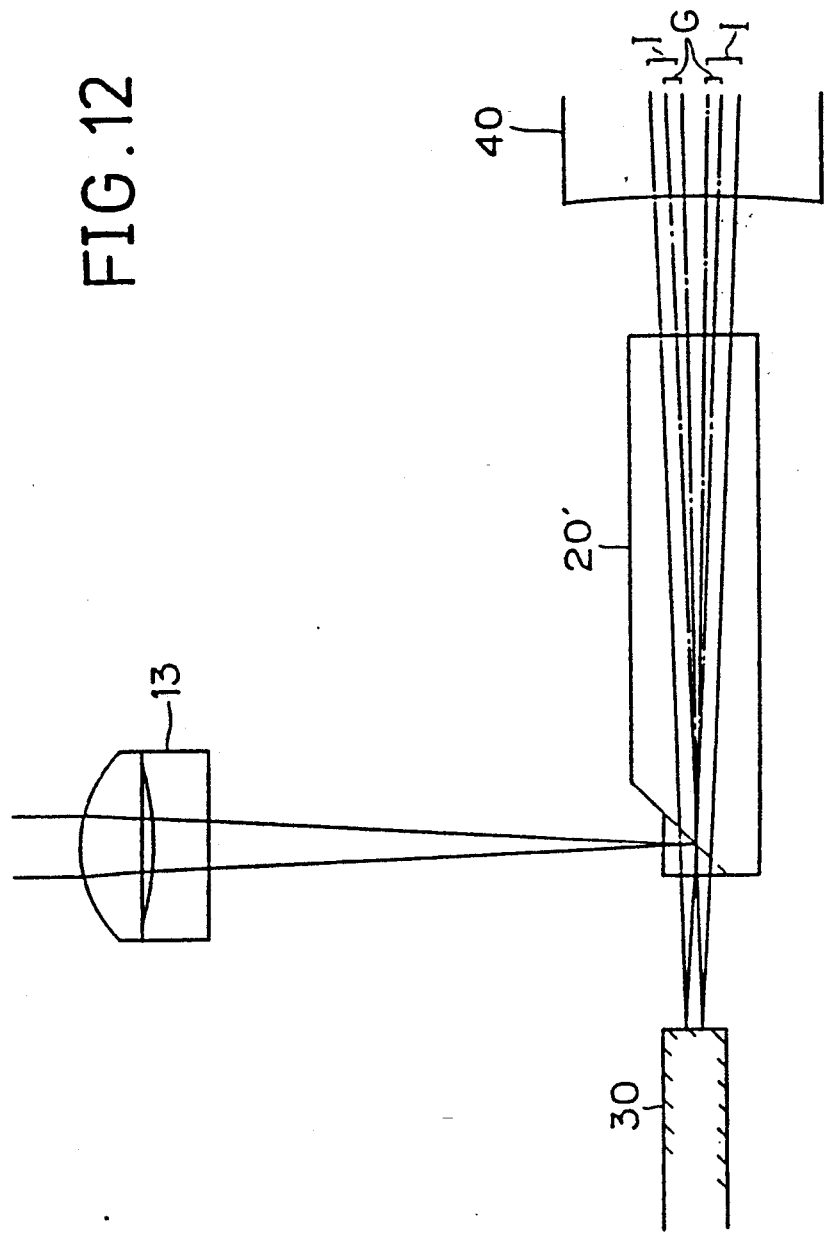
FIG. 12 is a schematic view illustrating the occurrence of ghosting due to internal reflection from one side of the prism block of Embodiment 2.

As shown in FIG. 12, a light beam from a light source (not shown is brought to an image on the slit mirror 21 by the cylindrical lens 13, and is fully reflected so as to impinge on the polygon mirror 30. The light beam reflected and deflected by the polygon mirror 30 then passes through the prism block 20' so as to impinge on the $f\theta$ lens 40. In FIG. 12, of the light beam which is incident on the $f\theta$ lens 40, I indicates the range of imaging light and G indicates the range of imaging light which includes ghosting.

The remaining construction is similar to that of Embodiment 1, with a screen (not shown) being provided in the vicinity of the scanning surface.

Figure 13:
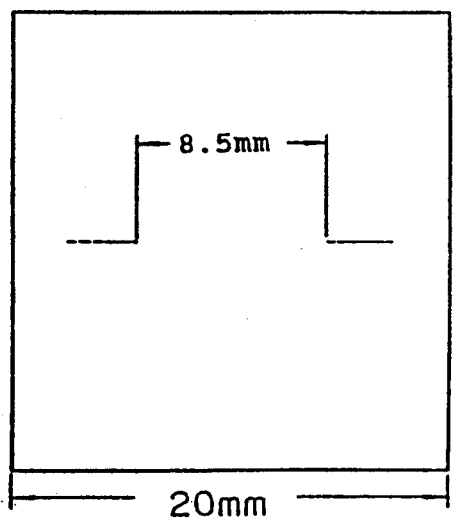
FIG. 13 is a schematic view illustrating the form of ghosting on an image of Embodiment 2.

The arrangement in the vicinity of the slit mirror is such that $\theta = 45°$, $w = 0.5$ mm, $dR = 5.0$ mm, $FNo. = 10$, $nF = 1.51072$ and $P = 53\%$. FIG. 13 shows the form of ghosting on the scanning surface 60 in the arrangement of FIG. 2 when the screen is not provided. The center region eclipsed by the slit mirror 21' is missing, the width of this region being approx. 8.5 mm.

Embodiment 3

In Embodiment 3, the sides 20a, 20b of the prism block 20 through which the light beam passes, as shown in FIGS. 1 and 2, are made curved surfaces with a large radius of curvature to the extent that this does not affect the imaging performance of the optical system, with the prism block as a whole being shaped like a meniscus. The ghosting G shown by FIG. 2 is then diffused by this curved surface.

To diffuse ghosting, it is sufficient if only one of the sides 20a, 20b is made a curved surface, but if the prism block is meniscus-shaped, the effect of the curved surfaces on the magnification of the optical system as a whole can be reduced.

If the focal length in the principal scanning direction of the scanning lens system is f, the radius of curvature of the sides of the prism block is R and the refractive index of the prism block is nF, the equivalent powers P1 and P2 in air of the side facing the polygon mirror and the side facing the f$\theta$ lens are respectively given by the following equations:

$$P1 = 2nF/R$$

$$P2 = (1-nF)R$$

The focal length f' of the optical system including the prism block can then be approximated by the following relations:

$$1/f' = (1/f) + (2nF/R) + \{(1-nF)/R\}$$

$$f' = Rf/\{R+(nF+1)\cdot f\}$$

The focal displacement $\Delta f$ of ghosting can therefore be approximated by the following relation:

$$\Delta f = f' - f = \{-(nF+1)\cdot f^2\}/\{R+(nF+1)\cdot f\}$$

If the F number of the optical system is F, the divergence of ghosting towards the principal scanning direction on the image plane is given by:

$$|\Delta f|/F = \{f^2 \cdot (nF+1)\}/[\{R+f(nF+1)\}\cdot F]$$

If on the other hand the two sides of the prism block are flat, the diameter Sy in the principal scanning direction of the spot on the image plane is effectively:

$$Sy = F/1000$$

As the divergence of ghosting in the principal scanning direction must be at least about 100 times the diameter of the spot, the following condition should be satisfied:

$$|\{f^2(nF+1)\}/[\{R+(nF+1)\}F]| > 0.1$$

In the aforesaid construction, the effect of ghosting is reduced by dispersing the ghosting in the principal scanning direction so as to reduce its energy density. If however this does not reduce its effect sufficiently, a screen may also be provided as in Embodiment 1.

As the prism block is meniscus-shaped, there is not much effect on the optical system as a whole. The focal length of the whole system is however somewhat altered, and the scanning width of the imaging light changes. In order to eliminate this variation, the lens intervals in the f$\theta$ lens or the degree of parallelism of the incident light may be adjusted.

Next, we will describe a specific numerical example of Embodiment 3. As the only difference from Embodiment 1 is in the prism block, only the figures for this piece are given in Table 3. This numerical example is suited to a semiconductor laser with an oscillation wavelength of $\lambda = 789$ nm, and where the laser beam impinges on the cylindrical lens with a degree of convergence of 0.047 diopter.

In the table, e1 is the distance from the basic reflection point on the polygon mirror to the side 20a of the prism block, e2 is the distance from the side 20b of the prim block to the first surface of the f$\theta$ lens 40, and dR is the distance from the line spread function image to the side 20a of the prism block.

TABLE 3

| surface number | e1 = 21.38 e2 = 23.83 dR = 10.00 | | | |
|---|---|---|---|---|
| | ry | rz | d | nF |
| 1 | −9900.0 | −9900.0 | 83.60 | 1.51072 |
| 2 | −10368.496 | −10368.496 | | |

Figure 14:
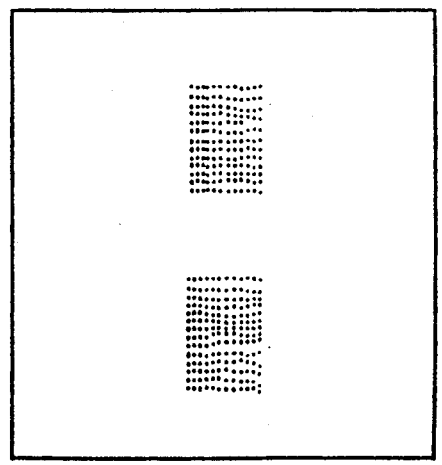
FIG. 14 is a schematic view illustrating the form of ghosting on an image of Embodiment 3.

In the above construction, as $f = 600$, $F = 25$, $R = -10134.248$, $nF = 1.51072$, $|\{f^2(nF+1)\}/[\{R+(nF+1)\}F]| = 0.21$ FIG. 14 shows the form of ghosting in the image plane according to the aforesaid construction. As shown in the figure, the ghosting is widely dispersed and its energy is therefore dispersed.

The sides of the prism block may also be cylindrical surfaces curved in the principal scanning direction instead of spherical surfaces.

As the prism block is meniscus-shaped, there is not much effect on the optical system as a whole. The focal length of the whole system is however somewhat altered, and the scanning width of the imaging light changes. In order to eliminate this variation, the lens intervals in the f$\theta$ lens or the degree of parallelism of the incident light may be adjusted.

Embodiment 4

Figure 15:
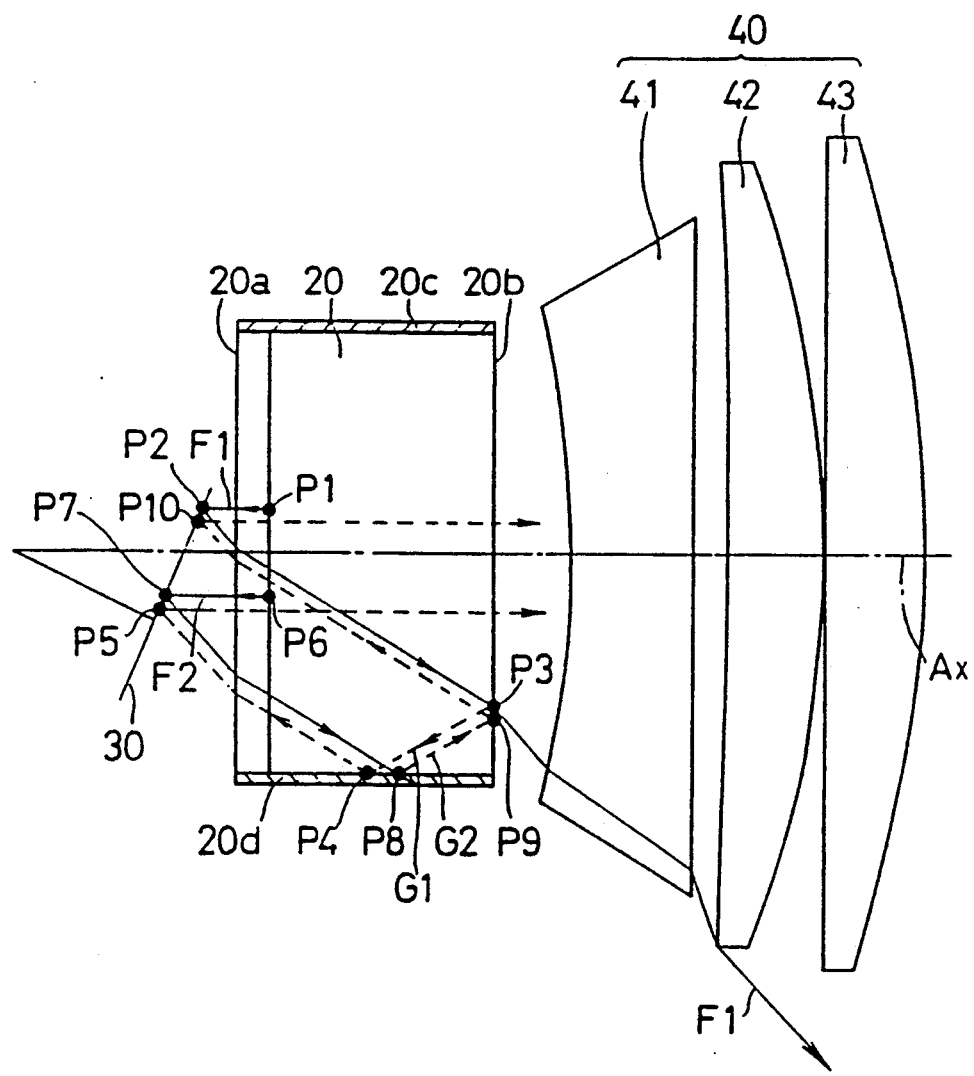
FIG. 15 is a schematic view illustrating the occurrence of ghosting due to internal reflection from one side of the prism block.

FIGS. 15 and 16 show the main parts of the optical system of Embodiment 4. Based on these figures, we will now describe the occurrence of ghosting due to internal reflection at the sides 20c, 20d of the prism block 20.

In this type of optical system, light rays also strike the sides 20c, 20d of the prism block 20 when the semiconductor laser is activated in order to obtain a horizontal synchronizing signal.

The light beam incident on the slit mirror has a width laying between points P1, P6 in the principal scanning direction, the symbols F1, F2 in the figure indicating the two edges of the light beam.

In FIG. 15, the imaging light F1 shown by the solid line which is reflected at the point P1 on the slit mirror 21 and a point P2 on the polygon mirror, reaches a point P3 on the side 20b of the prism block 20. Light which passes through the side 20b at the point P3 is outside the imaging range and is eclipsed by the lens frame, etc.

Light which is reflected at the point P3, however, is again reflected at a point P4 on the side 20d, and reaches a point P5 on the polygon mirror 30 as ghosting light shown by the broken line.

As the sides 20a, 20b are perpendicular to the sides 20c, 20d of the prism block, the imaging light F1 reaching P3 from P1 and the ghosting light G1 reaching P5 from P4 are parallel to one another irrespective of the angle of the polygon mirror. The ghosting light G1 reflected by the polygon mirror therefore impinges on the fθ lens 40 parallel to the light incident on the polygon mirror 30, i.e., parallel to the optic axis Ax of the fθ lens, irrespective of the rotation angle of the polygon mirror, and is converged toward the center of the scanning surface.

The imaging light F2 is reflected at the point P6 on the slit mirror 21 and at a point P7 on the polygon mirror 30, impinges on the prism block 20, and is reflected at a point P8 on the side 20d of the block so as to reach the side 20b. Part of this light returns as ghosting light to a point P10 on the polygon mirror 30, and passes through the prism block 20 and the fθ lens 40 to reach the scanning surface.

Figure 16A:
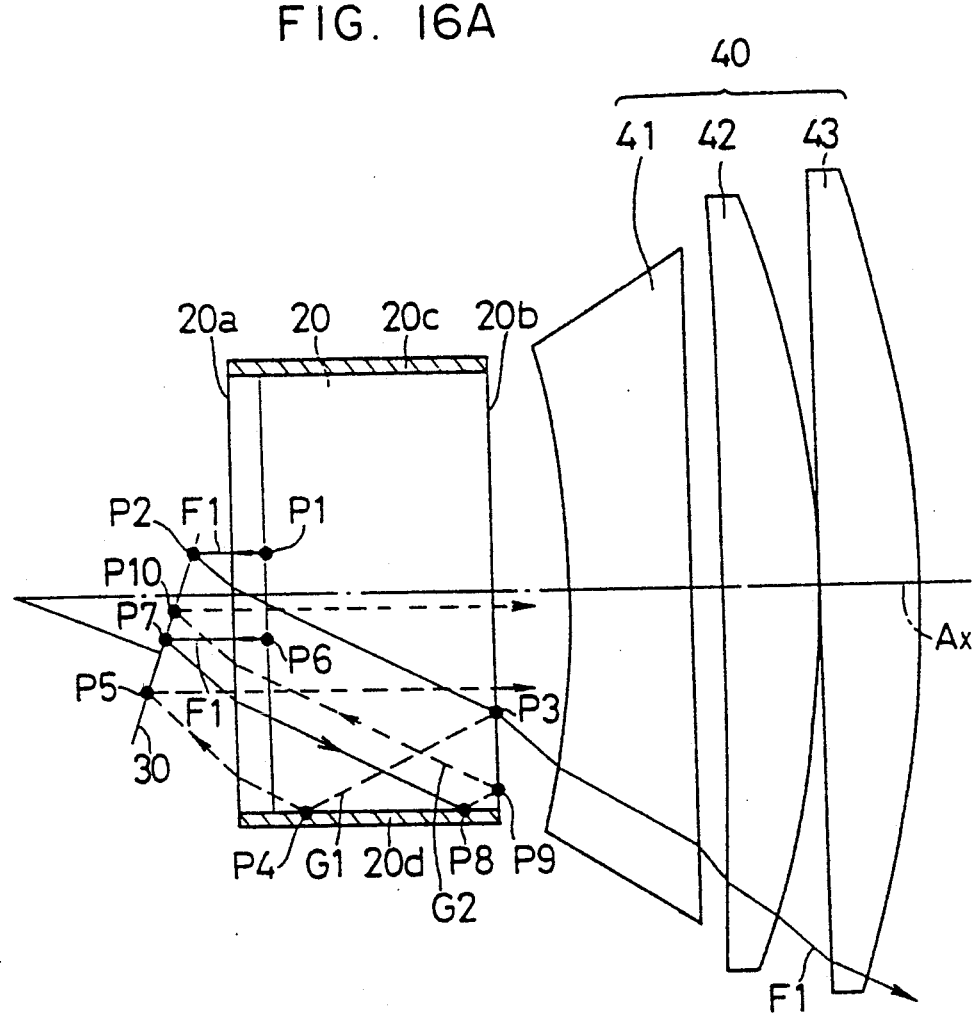
FIG. 16a is a schematic view illustrating the occurrence of ghosting due to internal reflection from one side of the prism block, wherein the rotation position of the polygon mirror is different from that of FIG. 15.

FIG. 16a shows the optical path when the polygon mirror 30 is rotated counterclockwise from the state shown in FIG. 15. The ghosting G1, G2 shown by the broken line impinges on the fθ lens 40 parallel to the optic axis Ax as in the case of FIG. 15 but lower down in the figure. However, as the incident light beam parallel to the optic axis Ax is still converged to the center of the scanning surface by the fθ lens, the position of the ghost on the scanning surface is essentially the same even if the incidence point changes.

In Embodiment 4, as shown in FIG. 16b, the sides 20c, 20d of the prism block are frosted (20c', 20d') in order to prevent the aforesaid ghosting from reaching the scanning surface. Light which is for example incident at the point P4 on the side 20d is therefore scattered by the frosted surface 20d' and does not return to the polygon mirror, so ghosting due to reflection at the sides of the prism block is prevented.

Figure 17:
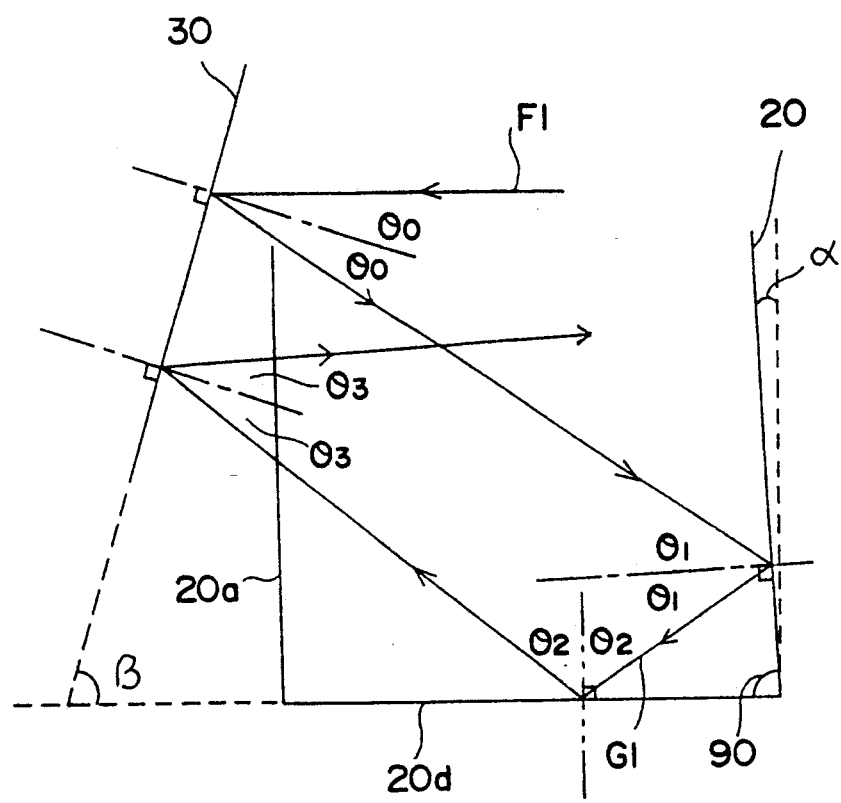
FIG. 17 is a schematic view similar to FIG. 16 wherein the corner angle of the prism block is not 90°.

FIG. 17 shows the path taken by ghosting when the corner angle of the prism block is not 90°. In FIG. 17, to simplify the explanation, we will not consider refraction at the side 20a which is unrelated to reflection at the sides.

If the angle between the side 20d and edge 20b of the prism block 20 is $(90-\alpha)°$, the angle between the side 20d and the reflecting surface of the polygon mirror 30 is $\beta$, and the incidence and reflection angles between the light and each surface are respectively $\theta0, \theta1, \theta2, \theta3$, we may write:

$\theta1 = 90° + \theta0 + \alpha - \beta$ $\theta2 = 90° - \theta1 - \alpha$ $\theta3 = \beta - \theta2$ and therefore:
$\theta3 = \theta0 + 2\alpha$ There is thus a fixed relation between the direction of the light which first impinges on the polygon mirror, and the direction of the light which is internally reflected at the corner of the prism and reflected again by the polygon mirror so as to impinge on the fθ lens. This relation moreover does not depend on the rotation position of the polygon mirror 30. Ghosting therefore always impinges on the fθ lens at a fixed angle so as to form a ghost at a fixed position on the scanning surface. The situation shown in FIG. 15 is a special case of FIG. 17 wherein $\theta3 = \theta0$.

In Embodiment 4, the case has been described wherein the sides of the prism block are frosted. The invention is however not limited to this example, and these sides may also for example be covered with an antireflection coating.

Embodiment 5

Figure 18:
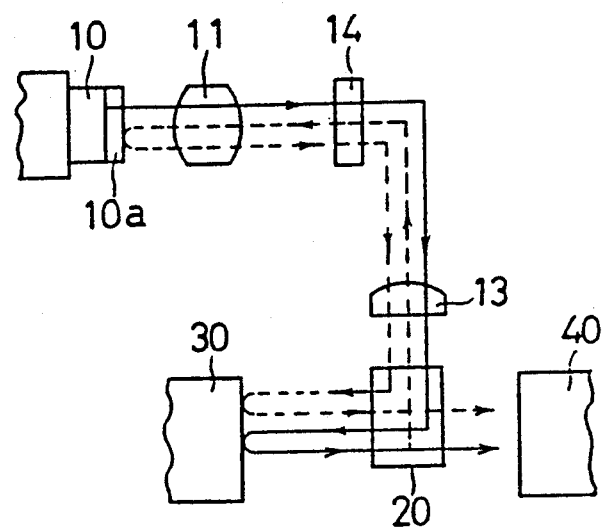
FIG. 18 is a schematic view illustrating the occurrence of ghosting due to reflection from the cover glass of the semiconductor laser of the optical system of FIG. 1.
Figure 19:
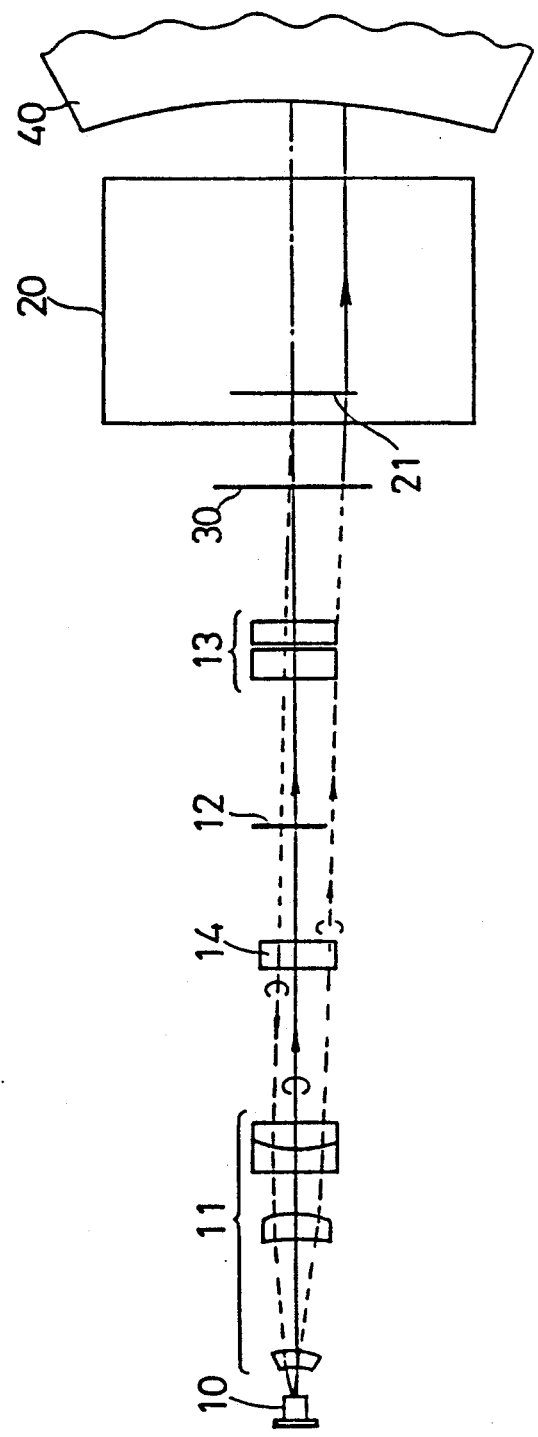
FIG. 19 is a schematic view wherein the optical system illustrated in FIG. 18 has been expanded.

We will next describe the ghosting that occurs due to reflection at the cover glass of the semiconductor laser, based on FIGS. 18 and 19.

Imaging light shown by the solid line in FIG. 18 is reflected by the polygon mirror 30 toward the fθ lens 40, but when it passes through the prism block 20, part is reflected by the slit mirror 21 back to the semiconductor laser 10 as ghosting, shown by the broken line in FIGS. 18 and 19, via the cylindrical lens 13 and mirror 12. This ghosting which has reached the semiconductor laser 10 is reflected by the cover glass 10a, and is then transmitted to the scanning surface via the polygon mirror 30 and the fθ lens 40.

The cover glass 10a of the semiconductor laser 10 is close to the light source, and is effectively an object point. The ghosting light reflected from the cover glass 10a therefore impinges on the polygon mirror at the same angle as when it is first reflected by the mirror, as shown in FIG. 19.

The ghosting reflected again by the polygon mirror impinges on the fθ lens at an effectively constant angle, i.e., at an angle parallel to the optic axis, irrespective of the angle of the polygon mirror 30. As the incident light which is parallel to the optic axis is converged toward the center of the scanning surface by the fθ lens, the position of the ghost on the scanning surface is effectively fixed.

Next, we will describe a means of preventing the aforesaid type of ghosting.

In Embodiment 5, a screen 14 is provided between the collimating lens 11 and mirror 12 so as to prevent the aforesaid ghosting from reaching the scanning surface. Of the light emitted by the semiconductor laser 10 and incident on the slit mirror 21, the screen 14 obstructs that part which is reflected by the slit mirror after being reflected by the polygon mirror 30.

Figure 20:
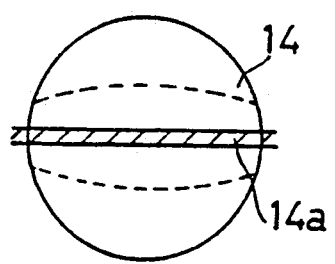
FIG. 20 is a schematic view of the screen illustrated in FIG. 18.

As shown in FIG. 20, a screening element 14a is formed in the center of the screen 14 in the principal scanning direction which eliminates the middle part of the light incident on the slit mirror 21 beforehand. There is therefore no part of the light reflected by the polygon mirror 30 which can be reflected by the slit mirror 21.

Consequently, no light returns to the semiconductor laser 10, and ghosting due to reflection at the cover glass 10a is prevented.

What is claimed is:

1. A scanning optical system comprising:
   a laser light source;
   a scanning deflector for deflecting the laser light emitted by said laser light source in a principal scanning plane;

a scanning lens for converging the deflected laser beam on a scanning surface;

a converging lens which first brings the light beam from said laser light source to an image in an auxiliary scanning plane that is perpendicular to said principal scanning plane;

a prism block comprising a slit mirror which coincides with the position at which the light beam is converged by said converging lens, and which reflects the laser beam towards said scanning deflector; and means for preventing ghosting which is produced on the scanning surface, by reflection of light in the optical system, at a fixed angle with respect to the scanning surface.

2. A scanning optical system according to claim 1, wherein said ghost preventing means is a screen installed in close proximity to said scanning surface for obstructing ghosting produced by internal reflection in said prism block.

3. A scanning optical system according to claim 1, wherein said ghost preventing means comprises a curved surface, formed on a side of said prism block through which the light beam passes, said curved surface having a radius of curvature which is sufficiently large to the extent that said curved surface does not substantially affect the imaging performance of said scanning optical system.

4. A scanning optical system according to claim 1, wherein said ghost preventing means is a reflection preventing means formed on one side of said prism block.

5. A scanning optical system according to claim 1, wherein said ghost preventing means is a screen installed in the optical path between said light source and said slit mirror for eliminating ghosting produced by reflection at said laser light source.

6. A scanning optical system comprising:
a laser light source;
a scanning deflector for deflecting the laser light emitted by said laser light source in a principal scanning plane;
a scanning lens for converging the deflected laser beam on a scanning surface;
a converging lens which first brings the light beam from said laser light source to an image in an auxiliary scanning plane that is perpendicular to said principal scanning plane;
a prism block comprising a slit mirror which coincides with the position at which the light beam is converged by said converging lens, and which reflects the laser beam towards said scanning deflector; and
means for diffusing ghosting which is produced by reflection of light, in the optical system, at a fixed angle with respect to the scanning surface.

7. A scanning optical system according to claim 6, wherein said ghost diffusing means comprises a curved surface, formed on a side of said prism block through which the light beam passes, said curved surface having a radius of curvature which is sufficiently large to the extent that said curved surface does not substantially affect the imaging performance of said scanning optical system.

8. A scanning optical system according to claim 7, wherein an incidence side and an emergence side of said prism block together form a meniscus shape.

9. A scanning optical system according to claim 6, wherein said ghost diffusing means is a frosted surface formed on one side of said prism block.

10. A scanning optical system comprising:
a laser light source;
a scanning deflector for deflecting the laser light emitted by said laser light source in a principal scanning plane;
a scanning lens for converging the deflected laser beam on a scanning surface;
a converging lens which first brings the light beam from said laser light source to an image in an auxiliary scanning plane that is perpendicular to said principal scanning plane;
a prism block comprising a slit mirror which coincides with the position at which the light beam is converged by said converging lens, and which reflects the laser beam towards said scanning deflector; and
means for preventing ghosting which is produced by internal reflection in said prism block, at a fixed angle with respect to the scanning surface.

11. A scanning optical system according to claim 10, wherein said ghost preventing means is a screen installed in close proximity to said scanning surface for obstructing said ghosting.

12. A scanning optical system comprising:
a laser light source;
a scanning deflector for deflecting the laser light emitted by said laser light source in a principal scanning plane;
a scanning lens for converging the deflected laser beam on a scanning surface;
a converging lens which first converges the light beam from said laser light source to a position, to form an image in an auxiliary scanning plane that is perpendicular to said principal scanning plane;
a slit mirror which, in conjunction with a prism block, coincides with said position at which the light beam is converged by said converging lens, said slit mirror reflecting the laser beam towards said scanning deflector; and
means for preventing ghosting produced by internal reflection in said prism block.

13. A scanning optical system according to claim 12, wherein said ghost diffusing means is a curved surface formed on a side of through which the light beam passes.

14. A scanning optical system according to claim 13, wherein an incidence side and an emergence side of together form a meniscus shape.

15. A scanning optical system according to claim 12, wherein said ghost diffusing means is a frosted surface formed on one side of said prism block.

16. A scanning optical system comprising:
a laser light source which emits light along an optical path;
a scanning deflector for deflecting the laser light emitted by said laser light source in a principal scanning plane;
a scanning lens for converging the laser beam deflected by said scanning deflector on a scanning surface;
a converging lens which first brings the light beam from said laser light source to a position to form an image in an auxiliary scanning plane that is perpendicular to said principal scanning plane;

a narrow slit mirror installed in said optical path at said position where said light beam is brought to an image by said converging lens and which reflects said light beam from said laser light source towards said scanning deflector; and a screen installed between said laser light source and said slit mirror, and which obstructs a part of the light beam incident on said slit mirror which would be reflected by said mirror after being reflected by said scanning deflector.

17. A scanning optical system comprising:

a laser light source;

a scanning deflector for reflecting the laser light emitted by said laser light source in a principal scanning plane;

a scanning lens for converging the laser beam deflected by said scanning deflector on a scanning surface;

a prism block installed between said scanning deflector and said scanning lens; and a screen installed in close proximity to said scanning surface for obstructing ghosting internally reflected at a surface of said prism block facing said scanning deflector.

18. A scanning optical system comprising:

a laser light source;

a scanning deflector for reflecting the laser light emitted by said laser light source in a principal scanning plane;

a scanning lens for converging the laser beam reflected by said scanning deflector on a scanning surface; and a prism block disposed between said scanning deflector and said scanning lens wherein at least one of the surface on which the light is incident or the surface from which it emerges is curved, said at least one curved surface having a radius of curvature which is sufficiently large to the extent that said at least one curved surface does not substantially affect the imaging performance of said scanning optical system.

19. A scanning optical system according to claim 18, wherein an incidence side and an emergence side of said prism block together form a meniscus shape.

20. A scanning optical system comprising:

a laser light source;

a scanning deflector for deflecting the laser light emitted by said laser light source in a principal scanning plane;

a scanning lens for converging the deflected laser beam on an image surface; and a flat plate provided between said scanning deflector and said scanning lens, said flat plate having at least one side, through which said laser light does not pass, provided with means for preventing reflection, wherein said at least one side of said flat plate is frosted.

21. A scanning optical system comprising:

a laser light source;

a scanning deflector for deflecting the laser light emitted by said laser light source in a principal scanning plane;

a scanning lens for converging the deflected laser beam on a scanning surface;

a converging lens which first brings the light beam from said laser light source to an image in an auxiliary scanning plane that is perpendicular to said principal scanning plane;

a prism block comprising a slit mirror which coincides with the position at which the light beam is converged by said converging lens, and which reflects the laser beam towards said scanning deflector, wherein said prism block includes a first prism which is mounted between said scanning deflector and said scanning lens, said first prism having an inclined surface, and a second prism having an inclined surface which is smaller than said inclined surface of said first prism, wherein said inclined surface of said second prism is cemented to said inclined surface of said first prism.

22. A scanning optical system comprising according to claim 21, wherein said second prism is mounted higher along said auxiliary scanning plane than said first prism.

* * * * *

UNITED STATES PATENT AND TRADEMARK OFFICE
CERTIFICATE OF CORRECTION

PATENT NO. : 5,299,050

DATED : March 29, 1994

INVENTOR(S) : A. MORIMOTO et al.

It is certified that error appears in the above-indentified patent and that said Letters Patent is hereby corrected as shown below:

At column 12, line 48 (claim 13, line 3), insert ---said prism block--- after "of".

At column 12, line 51 (claim 14, line 2), insert ---said prism block--- after "of".

Signed and Sealed this

Twenty-ninth Day of November, 1994

Attest:

BRUCE LEHMAN

Attesting Officer     Commissioner of Patents and Trademarks